UNITED STATES PATENT OFFICE.

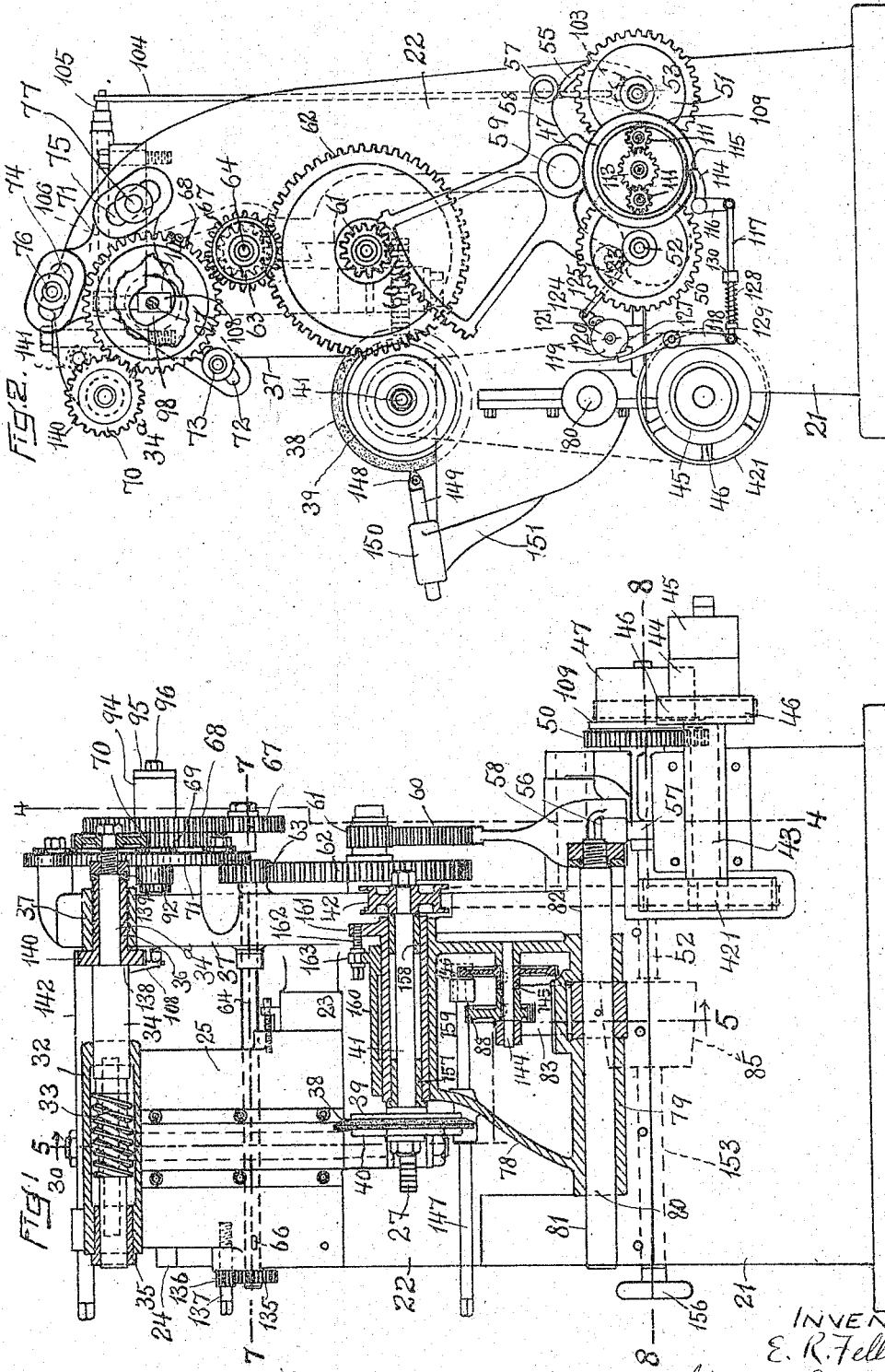

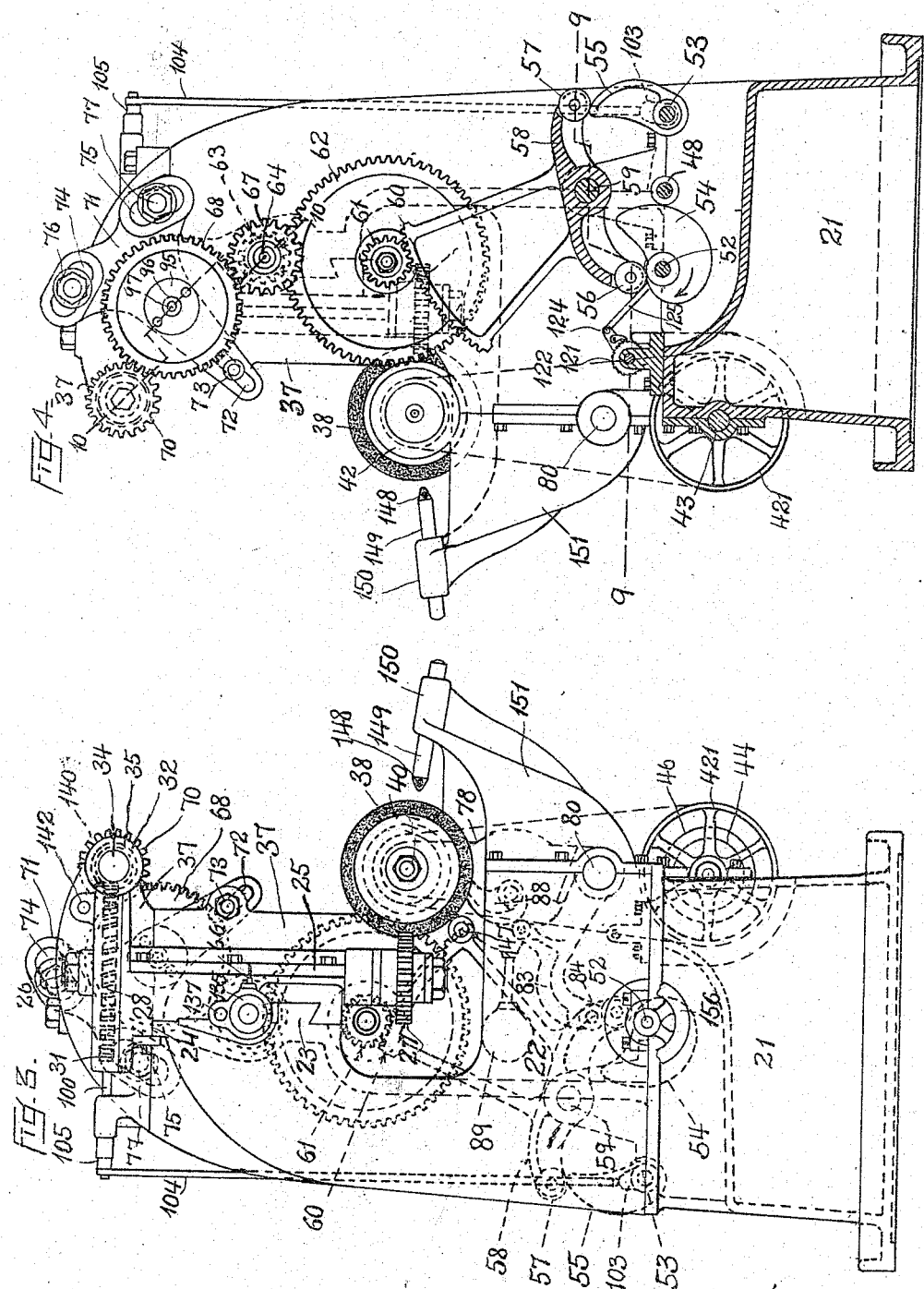

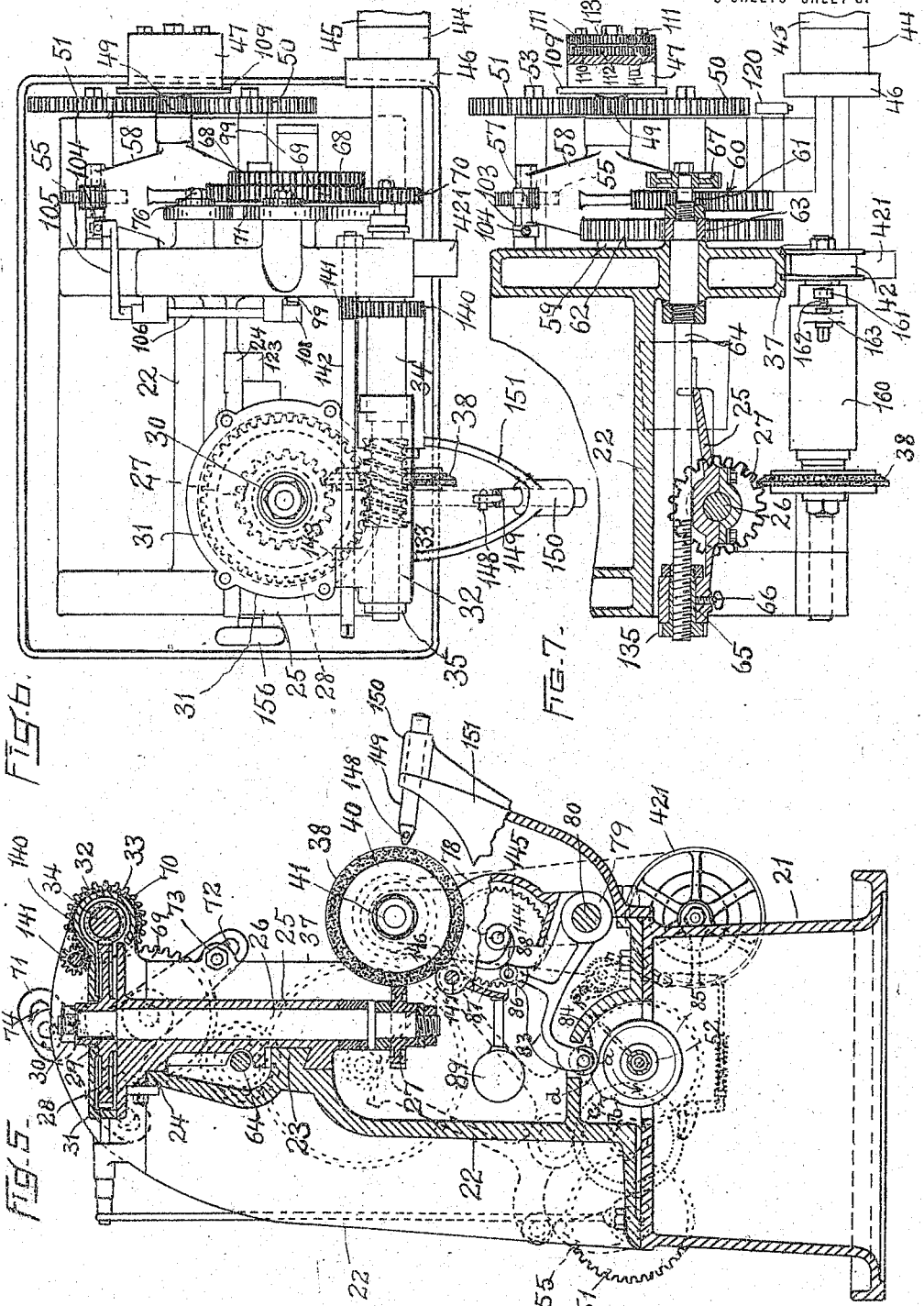

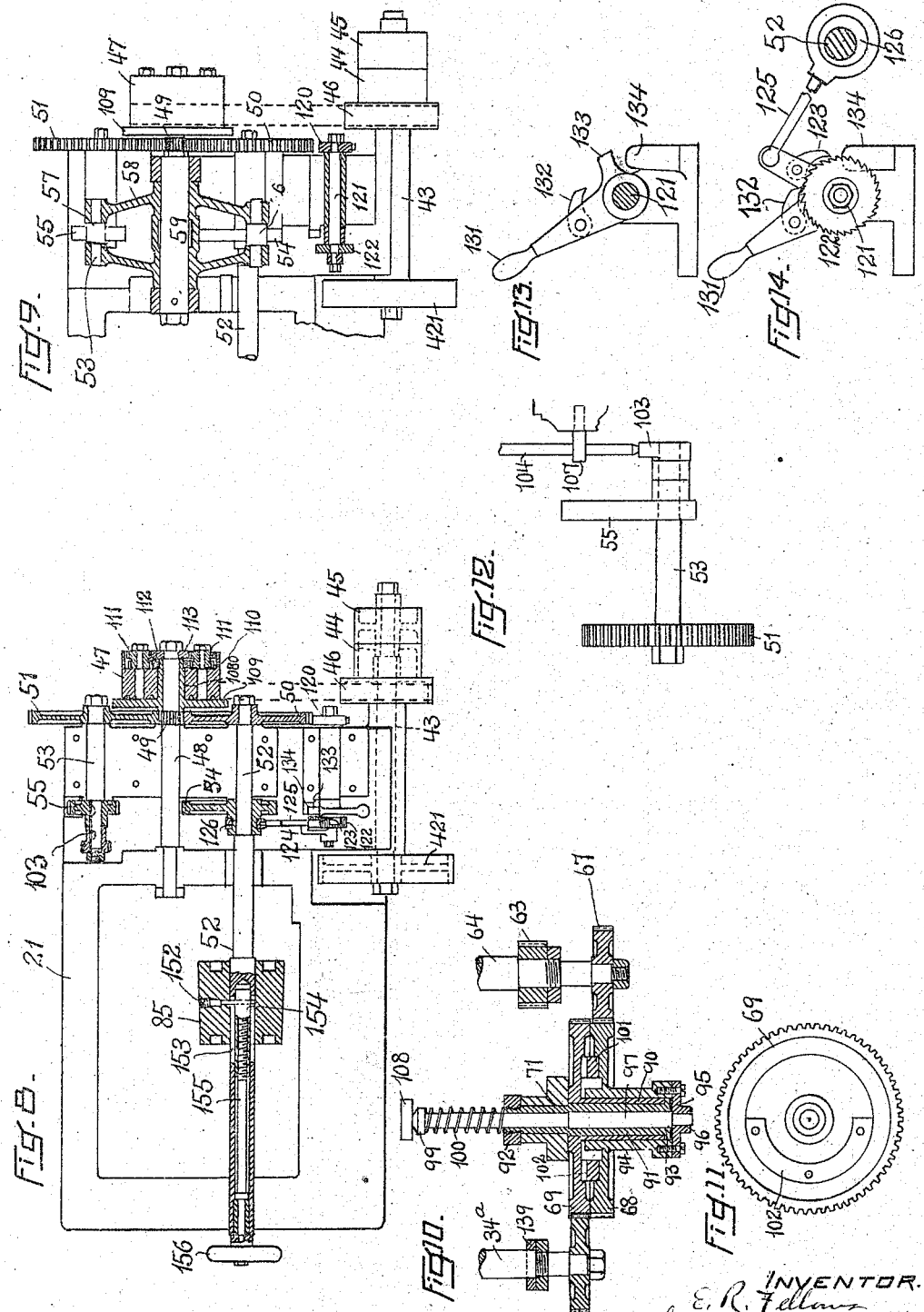

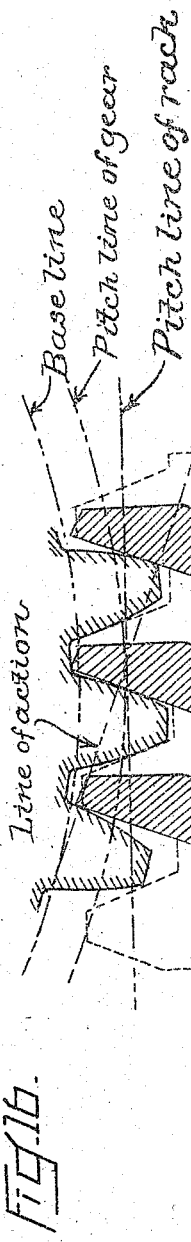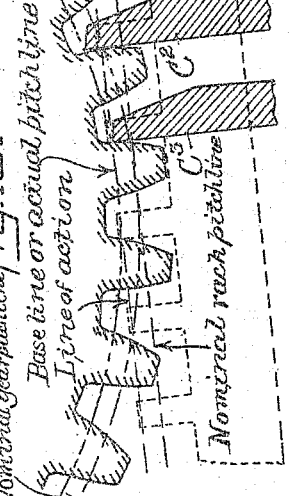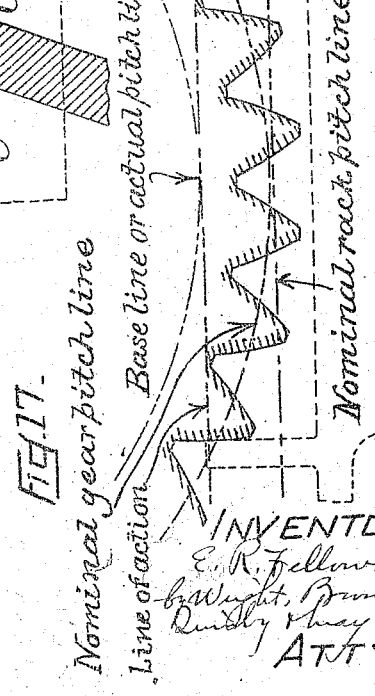

EDWIN R. FELLOWS, OF SPRINGFIELD, VERMONT.

GEAR-GENERATING MACHINE.

1,338,685.      Specification of Letters Patent.      Patented May 4, 1920.

Application filed December 24, 1917. Serial No. 208,547.

*To all whom it may concern:*

Be it known that I, EDWIN R. FELLOWS, a citizen of the United States, residing at Springfield, in the county of Windsor and State of Vermont, have invented new and useful Improvements in Gear-Generating Machines, of which the following is a specification.

The present invention relates to the art of generating gear elements, particularly those of the spur gear type, and has for its object, generally, to provide means by which the teeth of gears may be accurately cut and their face curves correctly generated with the use of a rotating cutting tool; and, specifically, to finish previously cut and hardened gears by grinding, with accurate generation of the tooth curves at the same time. The specific embodiment of the invention chosen for illustration herein is a grinding machine adapted to finish steel gears which have been rough cut and hardened and are therefore too hard to be cut by metal cutting tools, and the rotating tool of such machine is a grinding wheel; but the principles for which I claim protection are not limited by the nature of the tool used.

The principle on which the machine is based is that of generating the tooth face curves by producing a relative movement, essentially like that which occurs when a gear is rolled in mesh with a complemental gear or rack, between the work piece and a grinding wheel which has a face corresponding to the face of the complemental or conjugate tooth, the wheel being meanwhile driven rotatively at high speed with such face in contact with the face of a tooth on the work piece, whereby the latter is cut away to the desired form. This principle is explained in my prior Patent No. 686,599, granted November 12, 1901 entitled "Machine for grinding gear generating cutters," in connection with the disclosure of a machine designed to generate involute tooth curves by the action of a grinding wheel, the working face of which is a plane surface and corresponds to the tooth face of a rack, called in practice the "base rack," with which the gear is designed to mesh.

The main object of the present invention is to furnish a machine operating on the principle above indicated which shall be capable of producing finished gears having any size, any pitch, and any degree of tooth angle, within proper limits; and to provide in connection therewith such means and adjustments for this purpose, that the same machine may be fitted, in the briefest possible time and without substitution of parts other than the change of a small number of changeable gears, to turn out gears differing from one another in any of these characteristics. Further objects, contributory to that above stated, appear in the following description of a concrete machine embodying the principles of the invention and illustrating an operative means for carrying such principles into effect. The invention consists in the principles underlying the means embodied in said machine, as well as in the specific mechanisms so illustrated. Said machine is presented for the purpose of illustration and explanation of such principles without intent to limit the scope of the protection which I claim otherwise than as appears from the appended claims.

Figure 1 is a front elevation, with parts broken away and shown in section, of the particular machine referred to.

Fig. 2 is a right hand end elevation of the machine.

Fig. 3 is a left hand end elevation.

Fig. 4 is a cross section on line 4—4 of Fig. 1.

Fig. 5 is a cross section on line 5—5 of Fig. 1.

Fig. 6 is a plan view of the machine.

Fig. 7 is a horizontal section on line 7—7 of Fig. 1.

Fig. 8 is a horizontal cross section on line 8—8 of Fig. 1, showing the base and driving gear.

Fig. 9 is a sectional plan view of the parts intersected by line 9—9 of Fig. 4.

Fig. 10 is a sectional detail taken on line 10—10 of Fig. 4, looking downwardly and forwardly.

Fig. 11 is a detail elevation of one of the gears shown in Fig. 10, and of a clutch element associated therewith.

Fig. 12 is an elevation, represented as viewed from the rear of the machine (the right of Fig. 4), showing a detail of mechanism.

Figs. 13 and 14 are elevations, respectively, of a manually and an automatically operated controller for the tripping mechanism.

Figs. 15 and 16 are diagrams illustrating the special mode of action of this machine, and pointing out the difference thereof from that of the machine shown in my prior patent.

Figs. 17 and 18 are diagrams similar to Fig. 15 showing the action of the machine in grinding gears of different tooth angles.

Attention is first directed to the diagrams Figs. 15 to 18 inclusive for explanation of the principle of the invention in advance of a description of the details of the machine here shown. Fig. 16 represents the teeth of an involute gear of standard character in mesh with the conjugate base-rack. The pitch lines of the gear and of the rack, the base line of the tooth curves, and the line of action between the gear and rack teeth are shown on the diagram and are designated by appropriate legends. If in a gear grinding machine, a grinding wheel is provided with a plane operating face having the same relation to the gear that one face of the base rack has, and the same relative movement of displacement is produced between the gear and the grinding wheel as occurs when the gear is rolled in mesh with the rack, the grinding wheel, in reducing the gear tooth to finished form, will evidently generate the correct involute curve thereon. This is the principle upon which the machine disclosed in my prior patent works. In that machine the grinding wheel occupies the position of one side of a tooth of a base rack, and the gear to be ground is rolled about its pitch circle on a surface corresponding to the pitch line of the rack, under the control of tapes. In successive positions of the gear, the tooth being ground takes relations to the grinding wheel like those shown by the positions $C'$, $C^2$, and $C^3$ of the grinding wheel in Fig. 16. Here the grinding wheel is shown in different positions as though being shifted in accord with a gear rotating about a fixed axis, for clearness of illustration and to avoid the confusion of crossing lines caused by showing the gear tooth in the different positions it actually occupies in rolling by a grinding wheel which remains in one position. The desired motion of the gear is produced in the machine disclosed in said patent by securing it to a cylinder which is rolled upon a plane surface under the control of flexible tapes, and in order to grind gears of different diameters of pitch circle, it is necessary to provide for each diameter of gear a special cylinder of which the surface has the necessary relation to the pitch circle of the gear.

The same result of generating a proper tooth curve is obtainable by rolling the gear upon the base circle with respect to which the involute curve is generated, past a generating element which is fixed as to its position, the effect being to generate the same curve as is drawn when a scribing point is guided by the end of a string being unwrapped from the base cylinder. In terms of gearing the generating element becomes a point at or near the end of a rack tooth having a base angle of zero degrees, the exact location of this generating element being the intersection of the tooth face with the line of action. I have discovered that by arranging a grinding wheel with its cutting face to correspond with a rack tooth face of zero degrees, and by providing suitable mechanism for rotating the gear on its axis at any desired rate, at the same time that the gear is shifted bodily past the grinding wheel, I may by simple adjustments fit the same machine to grind gears of any diameter, any pitch, and any tooth angle, within limits. This is the principle upon which my present invention is based, and its effect is illustrated in Figs. 15, 17, and 18, wherein $C'$, $C^2$, $C^3$ represent the relations of the grinding wheel to successive positions on the gear tooth in grinding teeth of different angles. In Fig. 15 the tooth angle is the same as in Fig. 16, while in Fig. 17 the angle is greater and in Fig. 18 is less.

Referring now to the illustrated embodiment of the invention which contains the new principles, 21 represents the base or pedestal on which is mounted an upright frame 22 carrying the bed of the machine and equipped with guideways 23 and 24, on which is mounted the work-holding carriage 25, the latter being provided with the usual lips embracing the guideways, as shown in Fig. 5. In the carriage 25 is rotatably mounted a spindle 26, on one end of which the gear 27 to be ground is detachably clamped, and on the other end of which is attached a worm wheel 28, which I call for convenience of description, an "index wheel", the latter being held in place by a key 29 and a nut 30, and covered by a detachable casing 31 which also includes a worm box 32. In this worm box there is mounted a worm 33 which meshes with the index wheel 28, and is mounted on, preferably integral with, a spindle 34. This spindle passes through the worm box 32 and one (the left hand) end is fitted in a bushing 35 fixed in one end of the worm box. The opposite end of said spindle is reduced in diameter at $34^a$ and has its bearing in a bushing 36 mounted in a forwardly projecting rib 37 of the bed frame 22. The bushing 36 is threaded into its supporting socket, and is thereby made adjustable for a purpose presently described.

The grinding wheel is shown at 38 and is mounted upon a hub 39 to which it is clamped by a plate 40; and the hub is secured upon a spindle 41 to which is secured a pulley 42 adapted to receive a driving belt passing around a pulley 421 on a countershaft 43.

*Generating mechanism.*—In order to generate the tooth curves of the gear, the latter is given a traversing motion across the plane of the grinding wheel and is rotated at the same time to give the effect of a rolling motion such as it would have when rolling in mesh with its base rack. To produce this motion the carriage 25 is moved laterally and the spindle simultaneously rotated relatively to the carriage. These movements are effected by the mechanisms which I will now describe. A countershaft 43, mounted in its bearings in the machine base carries fast and loose pulleys 44, 45, and is driven by a belt engaging one of these pulleys. It also carries a fast pulley 46 from which power is transmitted by belt to a pulley 47 which drives a shaft 48 through a speed-reducing gear later described. Shaft 48 carries a pinion 49 which meshes with gear wheels 50 and 51 on shafts 52 and 53, respectively. Shaft 52 carries a cam 54 and shaft 53 a cam 55, the outlines of which are shown in Fig. 4. These cams engage with rollers 56 and 57, respectively, mounted on the arms of a rocker 58 which swings upon a pivot stud 59 and carries a gear segment 60. The latter meshes with a pinion 61 connected to a gear 62, and this gear meshes with a pinion 63 fixed to a lead screw 64 which engages a nut 65 (Fig. 7), mounted in the carriage 25 and prevented from rotating therein by a clamp screw 66. Cam 54, which is a slow feed cam, swings the gear segment 60 toward the rear during approximately three-quarters of the rotation of shaft 52, turning the lead screw 64 in the same direction of rotation, and thereby feeding the work carriage from left to right, the lead screw having a right hand thread. As the cams 54 and 55 rotate in unison, owing to the fact that the gears 50 and 51 are alike in pitch and diameter, and they are arranged so that each acts while the other is inoperative, the cam 54 gives the carriage a feeding travel at slow speed and the cam 55 gives it a quick return.

While the carriage is traveling during the working stroke, the index wheel rolls in mesh with the worm 33. If the index wheel and the gear being ground were of the same diameter and the worm held stationary, the relative rotation thus imparted to the gear through the spindle 26 would turn the gear in the proper manner with respect to the grinding wheel; but practically always the gear is of different diameter than the index wheel, ordinarily being smaller, wherefore the angle of relative rotation given to the gear by the index wheel rolling over a stationary worm is different from that required to generate the correct tooth curve, and the worm must be so rotated as to turn the index wheel through an additional angle, in the same direction when the gear is smaller than the index wheel, and in the opposite direction when it is larger. To explain this, let it be assumed that the gear being ground would turn through an angle of $n$ degrees between the point where the tip of a tooth thereof first comes into mesh with a rack tooth and the point where the root of such tooth comes to bear on the rack tooth. This is the angle through which the gear must be turned on its axis while in contact with the grinding wheel, and it is a multiple of the angle between two adjacent teeth. When the index wheel is of greater diameter than the gear and has teeth of the same pitch, or linear spacing on its pitch circle, as the gear, it turns in rolling in mesh with a stationary worm through an angle of $m$ degrees, which is less than the above defined angle of $n$ degrees. Therefore the rotation of the worm must be such as to rotate the gear $n-m$ degrees, which is the additional angle previously referred to. When the gear is larger than the index wheel, the value of $m$ is greater than the value of $n$, and the worm must turn the gear $m-n$ degrees in the opposite direction. The worm is rotated for this purpose by changeable gearing consisting of a change gear 67 on the screw 64, a compound intermediate gear consisting of associated coaxial gears or gear elements 68, 69, of which the element 68 meshes with the gear 67, and a change gear 70 on the worm shaft in mesh with the gear element 69. The elements 68 and 69 operate together during the feeding travel, and therefore transmit motion from the gear 67 to the gear 70. As the worm 33 is turned thereby in the same direction of rotation as the lead screw, and as, in the machine here illustrated, it is desired to increase the angle through which this gear is turned, the inclination of the worm thread is made opposite to that of the screw. The gears 67 and 70 are changed according as a larger or smaller workpiece requires a less or greater increase in the angle of its rotation, and the intermediate gear is mounted on a holder 71 which permits it to be shifted so as to mesh with the substituted gears of all sizes within the limits of the machine. This holder is provided with a slot 72 radial to the intermediate gear, through which passes a stud 73 from the machine frame, and two slots 74, 75 concentric with the stud 73, through which pass studs 76, 77, respectively; all of these studs carrying clamp nuts.

*Grinding wheel mechanism.*—In this machine the acting face of the grinding wheel is in a plane perpendicular to its rotational axis, and the latter is parallel to the line of travel of the work. Thus the grinding wheel corresponds to the side of a rack tooth having teeth at no inclination as shown in Fig. 15. The contact of a tooth of this form with a gear tooth is confined substantially to the tip of the rack tooth. If the contact of the grinding wheel with the work were limited in this manner, however, the wear upon the wheel would be excessive, and therefore provision is made for shifting the wheel toward and away from the line of travel of the work to distribute the wear. In this machine, which is arranged so that the point or outer extremity of the gear tooth is the part which first engages the grinding wheel, the wheel axis is nearest to said line of travel when the grinding commences, and it is gradually withdrawn so that the point on its face which makes contact with the gear tooth gradually approaches its tip; and then at the conclusion of the grinding travel, it is quickly withdrawn to clear the gear and permit indexing of the latter. To permit of this movement the wheel spindle 41 is mounted in a rocking wheel carrier 78 which has a hub portion 79 mounted on a shaft 80, the ends of which have bearings at 81 and 82 in the bed frame. An arm 83 fixed upon this shaft carries an antifriction roll 84 which bears on a cam 85 mounted on the shaft 52, previously described. This arm 83 also has a projection 86 carrying an antifriction roll 87 which bears against an adjustable abutment 88 on the wheel carrier; said abutment being adjustable for a purpose later described, and being held against the roll 87 by gravity acting through a weight 89 on the carrier. Cam 85 is rotated in the direction of the arrow shown in Fig. 5. Its surface from the point $a$ to the point $b$ pushes out gradually from the axis, and while this portion acts, the wheel is gradually moved outward. From $b$ to $c$ is a sharp rise, which quickly withdraws the wheel from the tooth space to permit indexing. From $c$ to $d$ is a dwell which holds the wheel away from the gear while the latter is being indexed, and from $d$ to $a$ is a quick descent to the lowest point of the cam for returning the wheel into position to commence a new grinding action.

*Indexing mechanism.*— As before explained, the generating motion of the gear is obtained by rotation of the worm 33 while the carriage is shifted in one direction. If it should be desired that the gear and index wheel have the same rolling contact during the quick return travel as during the slower working travel, it would be necessary to reverse the direction of rotation of the worm during the return travel, and rotate it at the same proportional rate of speed, with reference to the translative travel of the carriage. But, if the worm should be caused to stand still, or to rotate reversely at a different proportional speed for a regulated length of time during such return travel, or to continue rotating in the same direction at the same or a different proportional speed during the whole or a part of the return travel, the relation of the work to the grinding wheel would be so altered as to bring a different tooth into position to be ground. I have here shown the application to practical use of that form of the principle above described which consists in causing the worm to stand still in the course of the carriage return in order to index the work, although without limiting the scope of protection which I claim herein to that form alone or excluding therefrom either of the other forms suggested. In applying the particular form of means chosen for illustration, I have made the intermediate gears 68 and 69 in two parts, as before described, and cause one of these parts to remain stationary during part of the carriage return. The hub 90 of the gear element 69 (Fig. 10) turns on a tubular stud 91 which passes through the holder 71 and is secured thereto by a nut 92. This stud has a flange 93 overlapping the hub 90 and preventing axial displacement of the latter. Gear element 68 has a hub 94 which fits slidably on the hub 90 and to the outer end of which is secured a plate 95 covering the end of the hub 90 and stud 91, and in which is fixed, by a nut 96, a push rod 97 which runs through the tubular stud 91 and through an opening 98 in the adjacent rib 37 of the bed frame. On its end it has a head 99 between which and the stud 91 is confined a spring 100 which holds the gear elements in the relation shown in the drawings, in which a clutch element 101 on the gear element 68 is in condition to engage and coact with a clutch element 102 on the gear 69.

For disengaging the clutch there is provided a tappet 103 on the shaft 53 (Figs. 4 and 12) which, on each revolution of the shaft displaces endwise a connecting rod 104, pivoted at its upper end to a lateral arm 105 on a rock shaft 106 (Fig. 6) its lower end being confined by a guide 107 (Fig. 12). This rock shaft carries an arm 108 extending across the end of the push rod 97; the whole arrangement being such that when said tappet pushes on the rod 104, the rod 97 is pushed outward and the gear 68 unclutched from the gear 69. This action occurs after the work carriage has ended its working travel and before it has completed its return travel. The power transmission between the feed screw and the worm being thus disconnected, the worm stands still and the index worm wheel 28 in rolling over it is turned through a smaller angle than during the feeding travel, and so indexes the gear. To make use of the above described method of indexing, it is necessary that the worm be driven during the grinding action on one tooth far enough to turn the gear through an angle equal to or greater than the tooth spacing in addition to the angle through which the gear is turned simply by the rolling of the index wheel on the worm. That is, the additional angle of $n-m$ degrees, previously defined, must be equal to or greater than the angle between corresponding points on two adjacent teeth of the gear. It is also necessary that the ratio of the number of teeth in the change gear 70 on the worm to the number of teeth in the gear 27 being ground be equal to the ratio of the intermediate gear 68 to the index gear 28, when the index gear 28 and the gear 27 have the same pitch. When the pitches of these gears are different, the desired effect may be secured by compounding the elements 68, 69, of the intermediate gear in proportion to the ratio of such pitches. That is, if the pitch of the index gear 28 be assumed to be $P$ and that of the gear being ground is $p$, then the ratio of the intermediate gear element 68 to the gear element 69 is made equal to the ratio of $P$ to $p$. Another means of accomplishing the same result is to introduce in the train of gears between 67 and 70 another pair of gears having the same ratio.

The clutch members 101 and 102 are here shown as each being the half of a ring, the ends of one abutting against the ends of the other when engaged, and one riding over the other when disengaged. The spring 100 automatically restores them into engagement when the gear 68 has completed one revolution after disengagement. The position, or form, or both, of the tappet 103 determines the time of disengagement of the clutch, to the end that the part of the return travel of the carriage during which the worm remains stationary will be enough to cause correct indexing of the work. It is to be understood, of course, that the clutch members may be appropriately modified to accomplish the desired result of indexing the work in cases where the rotation of the worm in turning the work through a tooth space is accomplished with less than a complete revolution of the intermediate gear.

*Tripping mechanism.*—The drive for the carriage feed mechanism includes a speed reduction gear between the pulley 47 and the shaft 48. The pulley turns loosely upon a hub 1080 (Fig. 8) which in turn is rotatable about the shaft 48 and is provided with a flange 109. The pulley carries double planet gears 110, 111, which run in mesh with sun gears 112, 113, respectively, the former of which is fixed to the hub 1080 and the latter to the shaft 48. When the flange 109 is held stationary, the planet gears cause the sun gear 113 to rotate slowly since the latter has a different number of teeth, which may be greater or less, than the sun gear 112, thus driving shaft 48 slowly. When the flange is no longer held from rotation, the rotation of the shaft 48 of course ceases. The purpose of the tripping mechanism about to be described is to release the flange 109 to stop the machine when all the teeth of a gear have been ground. This tripping mechanism is shown in Figs. 2, 4, 8, 13, and 14. A pawl 114 (Fig. 2) is pivoted in position to engage an abutment 115 on the flange 109, and to it is connected an arm 116 to which is pivoted a link 117 connecting said arm with a pivoted rock lever 118 having an arm 119 which bears on the rim of a trip disk or cam 120. This trip cam is fixed to a shaft 121 on which there is also fixed a ratchet wheel 122, (Figs. 4 and 14) and the latter is driven intermittently by a pawl 123 on a pawl carrier 124 which is oscillated by a connecting rod 125 from an eccentric 126 on the shaft 52. The trip disk 120 has a notch 127, which, when it comes opposite to the arm 119 allows the latter to enter and permits the pawl 114 to release the flange 109. The pawl is impelled to this effect by a spring 128 coiled around the link 117 and confined between a collar 129 on said link and a guide 130 fixed to the machine base through which said link passes. In order to start the machine again there is provided a hand lever 131 carrying a pawl 132 engaging the ratchet 122, and having a lug 133 overhanging a fixed stop 134. When the lever is turned from the position shown in Fig. 13 until this lug strikes the stop, it turns the trip disk 120 far enough to crowd the arm 119 out of the notch 127 and shift the pawl 114 into the notch 115 of the trip flange. A special ratchet 122 is provided for each size of gear to be ground, the number of teeth on the ratchet being enough greater than the number of teeth on the gear to permit the above described starting motion.

*Adjustment of carriage on bed.*—Various adjustments are provided for convenience and accuracy. One is for moving the carriage on the bed without disturbing the screw and its operating mechanism, used when setting up new work on the machine. This adjustment is accomplished by rotating the nut 65 in the carriage, and for this purpose the nut is equipped with a gear 135 which meshes with a pinion 136 on a stud shaft 137 mounted in the carriage beside the lead screw. This shaft may be turned by a wrench, after releasing set screw 66, and after adjustment the set screw is again tightened.

*Adjustment of gear tooth to wheel.*—If, after grinding all the teeth of a gear on one side, more stock needs to be removed from the gear teeth, the gear must be rotated slightly toward the grinding wheel. This is accomplished by moving the worm 33 endwise, and it is for this purpose that the bushing 36 is threaded into its socket as previously described. One end of the bushing abuts against the shoulder 138 on the worm spindle, and its other end abuts against a washer 139 fixed on the same spindle by a nut. A gear 140 is fixed on, or made as part of, the bushing and meshes with a pinion 141 (Figs. 5 and 6) on a shaft 142, which has a bearing in the fixed frame and passes through a guide 143 on the carriage. This shaft also may be rotated by a wrench, and when rotated it causes the bushing to be shifted by means of its thread endwise in one direction or the other.

*Adjustment of grinding wheel for gear diameter and for truing.*—The position of the wheel and of its arc of swing must be shifted to suit gears of different diameters, and for this purpose the rocking carrier 78 is movable about the shaft 80 independently of the operating arm 83, and the abutment 88 which transmits the thrust of the operating arm of the carrier is made adjustable. This abutment has the form of a spiral cam fixed on a shaft 144 having proper bearings in the wheel carrier, and also fixed on the same shaft is a gear 145 in mesh with a pinion 146 carried by a shaft 147 having bearings in the wheel carrier and adapted to be turned by a wrench.

A truing diamond 148 is mounted in a holder 149 held in a socket 150 on a bracket 151 projecting from the base beside the outer rim of the grinder wheel. The abutment 88 may be adjusted to a point where the rim of the grinder is caused to oscillate back and forth past the diamond, and the latter may also be adjusted by shifting the holder 149 in the socket 150 so as to engage the wheel even when the latter is in a forward adjustment.

*Adjustment of extent of wheel travel.*— The depth of teeth varies in gears of different sizes and pitches. It is therefore necessary to vary the amplitude of swing of the wheel carrier, and this is accomplished by giving the cam 85 a tapered form and making it axially adjustable. The throw of the cam at its small end is sufficient for gears of the finest pitch which it is desired to grind, and the throw at the large end is sufficient for gears of the largest pitch, while the surface between such ends is a continuous gradual taper. Different zones which have respectively different extents of throw are brought into action upon the carrier by shifting the cam endwise, and therefore the cam is fitted to slide on the shaft 52. It is engaged therewith by a screw pin 152 provided with an extension which passes through slots 153 in the opposite sides of the shaft, which is bored out from one end to this point, and through a nut 154 slidingly fitted in the bore of the shaft. This nut has the form of a sleeve engaged near one end with the screw 152 and having a threaded bore engaged with an adjusting screw 155 on which is mounted a hand wheel 156 accessible outside of the machine base. Screw pin 152 both prevents rotation of the nut 154 and transmits the axial movement of the latter to the cam.

*Adjustment of grinding wheel for wear.*—The operating face of the wheel gradually becomes worn away by the work and by action of the truing tool, and it must be shifted endwise to compensate for this wear. For this purpose the bearing bushings 157, 158 for the grinder spindle 41 are mounted in a sleeve 159 slidable through a tubular part 160 in the wheel carrier. This sleeve is provided with a tapped lug 161 in which is threaded a screw 162 having a bearing in a lug 163 on the carrier and provided with collars embracing said lug 163, preventing its endwise movement.

*Generating teeth of varying involute angles.*—The pitch or lead of the screw 64 and worm 33 are designed to cause generation of involute tooth curves which will mesh with a rack having a given tooth angle; for example, an angle of 20°. The tooth angle curve may be varied by changing the rotational speed of the worm relative to that of the screw, which changes the rate of rotation of the gear and has the same effect as though the gear were caused to roll on a different base circle. Illustrations of such variations are shown in Figs. 17 and 18, in comparison with Fig. 15; Fig. 17 showing the effect of rolling on a relatively smaller base circle, with increase in the angular travel of the teeth and Fig. 18 showing the effect of rolling on a relatively larger base circle with a smaller angle of movement of the teeth.

One means of accomplishing this result is to change the gears 67 and 70. Another means is to provide for the gear elements 68 and 69 gears having different numbers of teeth, the ratio between the numbers of teeth on these gears being equal to the ratio of the cosine of the desired tooth angle to the cosine of 20°, or any other predetermined angle with respect to which the screw is designed in the first instance.

From the foregoing explanation it will have become evident that this invention provides great flexibility of adjustment whereby the machine may be fitted to produce work of varying characteristics, simply and quickly. The provision of an index gear wheel and a worm for driving the same is a particularly useful feature on account of the flexibility of adjustment which it affords. The machine possesses also the fundamental essential of accuracy. To secure correct results it is sufficient to give the proper lead to screw 64 and to the worm 33, and to provide transmission gears, including the changeable gears, of proper value, all of which are determinable by mathematical calculation according to well understood principles of gearing. It is preferable, however, to give the screw and the worm equal leads, or at least not to have any variance further than that occasioned by giving the worm a multiple thread, the latter being convenient for grinding small gears to avoid an inconveniently large ratio of the change gears.

The simplest form of the problem involved in the use of the machine is the grinding of a gear having the same pitch as the index wheel. In this case the diameter of the change gear 70 on the worm is the same as the diameter of the gear to be ground, and the sum of the diameters of the change gears 67 and 70 is equal to the diameter of the index gear 28. From this condition variations may be made by changing the ratio of the change gears, or the ratio of the intermediate gears, or by introducing a separate pair of connected gears in the gear train, although practically all variations obtainable by the third named adjustment are obtainable equally by changing the ratio of the intermediate gears. By these simple adjustments, together with the corresponding adjustments of the grinding wheel, the machine may be caused to turn out finished accurately formed gears of any diameter, any pitch and any tooth angle.

The principles embodied in the machine hereinbefore described are not restricted to one in which the grinding wheel remains in the same location and the gear is carried in a straight path and rotated about its own axis. It is only necessary that a relative motion should take place between the gear and grinding wheel which is similar to that occurring between a gear and a rack when running in mesh, whether the rack is stationary and the gear rolls over it, or the gear is rotated and the rack is moved, or the gear is stationary and the rack is rocked about it. Means for securing this relative movement in all of the ways in which it may occur are within the scope of my invention. Therefore I do not limit my protection to the specific construction and arrangement here shown except as may be required by the express terms of the claims hereto annexed.

Other features of the invention, including the provision for a lateral or transverse movement of the grinding wheel during the continuance of the grinding action, and the character of means for turning the gear during this action, are not necessarily restricted to an arrangement in which the grinding wheel face corresponds to the tooth face of a rack having an inclination of zero degrees. The transverse movement of the wheel is particularly intended to distribute the effect of wear over its face, and is further provided to increase the range of action in grinding teeth of large angle, as indicated in Fig. 17. These results are equally useful in cases where the face of the grinding wheel is inclined, and the direction of shifting is otherwise than perpendicular to the line of relative translative motion between the grinder and gear, although still transverse to such line. Accordingly my claims to the last named features are not restricted, except as it appears from their terms, to the application of such features to the particular machine and in the particular form and arrangement hereinbefore described in detail.

It will have become apparent from the foregoing description that a machine embodying the principles of my invention as described accomplishes the important effect of generating correct involute tooth curves by true mathematical generation, as distinguished from reproducing curves previously formed in guides or templets, or in the cutting tool. The term "generating" is here used with the mathematical definition, and as applied to the specific case described, it means the development of an original curve by the relative motion between the work piece and the cutting point in accordance with the mathematical law of involute curves. As such motions are simple, consisting only of circular rotation about an axis and linear travel upon straight guides, at rates of speed which are determinable mathematically and are capable of being produced accurately, the result is the generation in the tooth of an original curve without sensible error.

This relative motion is in effect the same as the rolling of the gear blank upon its base circle on an imaginary surface in which the active point in the cutting face of the grinding wheel is located. Therefrom it results that the axis of the grinding wheel may be set parallel to the line of relative linear displacement between the work and tool, which insures the greatest possible accuracy in construction and operation of the machine.

A grinding wheel is essentially a cutter, differing from a metallic edged rotary cutting tool in that the cutting points are irregularly scattered over its surfaces instead of being in given lines. Other types of cutter, as for instance those made of metal having distinct cutting edges in a plane perpendicular to the rotational axis, may be used with like effect in generating and cutting tooth curves in work pieces whereof the degree of hardness is such as to permit of being cut by such edges; and such cutters are equivalent to the grinding wheel particularly herein described within the scope of protection intended to be secured by the following claims. The term "grinding wheel" and equivalent terms used in this specification and in the claims are therefore to be construed as typifying any cutting tool capable of use in a machine having the characteristics there pointed out for obtaining the results set forth.

What I claim and desire to secure by Letters Patent is:

1. A gear generating machine comprising a generating tool, a carriage for the work piece movable past said generating tool, a rotary holder for said work piece, an index wheel connected to said holder, a worm engaged with the teeth of said index wheel and withheld from movement in unison with said carriage, and means for rotating said worm during the travel of said carriage.

2. In a gear grinding machine of the generating type wherein relative movement of displacement is caused to the place between the gear to be ground and a grinding element, and such gear is at the same time rotated on its axis, a means for thus rotating said gear comprising an index wheel associated therewith and a rotatable worm meshing with the index wheel between which and the index wheel similar displacement movement is caused to take place at the same time with the aforesaid displacement.

3. A gear generating machine comprising a rotatable tool having cutting elements in a plane perpendicular to its rotational axis, an index wheel, means for connecting a work piece with said index wheel, a worm meshing with said index wheel, mechanism for producing relative translative movements between said index wheel and the work piece on the one hand and the generating tool and worm on the other hand, and means for simultaneously rotating the worm whereby to effect a predetermined character of rolling motion of the work piece relatively to the plane of said cutting elements to cause generation by the latter of a curved surface in the work piece.

4. In a gear generating machine, a carriage, a lead screw for moving said carriage, a spindle adapted to carry a gear rotatably mounted in said carriage, an index wheel mounted on said spindle a worm meshing with said index wheel and so held that it does not travel with the carriage, and gearing between said screw and worm for turning the worm at a predetermined rate of speed.

5. In a gear grinding machine having a grinding wheel and a carriage for the gear to be ground movable to transport the gear past said wheel with the face of a tooth of the gear in contact with the wheel, complemental intermeshing screw elements comprising a lead screw and a nut, one of which elements is rotatable, and one of which is secured to said carriage for so moving the carriage, a toothed index wheel connected with the gear, a worm having its axis parallel with the travel of the carriage for causing rotation of the wheel and gear as the carriage moves, and changeable transmission gears in train with one another, one of which is connected with the rotatable one of said screw elements and the other of which is connected with the worm for rotating the worm in unison with said screw element.

6. In a gear grinding machine, a grinding wheel, a carriage for the gear to be ground, movable to transport such gear past said wheel with the face of a tooth of the gear in contact with the wheel, complemental intermeshing screw elements comprising a lead screw and a nut, one of which elements is rotatable, and one of which is secured to the carriage for so moving the carriage, a toothed index wheel connected with the gear, a worm having its axis parallel with the line of travel of the carriage for causing rotation of the wheel and gear as the carriage moves, said worm and lead screw having threads of the same pitch, a changeable gear connected with the rotatable one of the aforesaid screw elements, and a changeable gear connected with the worm, said gears being in train to cause rotation of said screw element and the worm in unison, and the sum of the diameters of said changeable gears being equal to the diameter of the index wheel.

7. In a gear generating machine the combination with a cutting tool and a holder for the same, of a holder for the gear to be generated, means for producing relative movement between said cutting tool and gear holder similar to that which occurs between a gear and a rack when running in mesh in any manner, and means for producing rotation of the gear at the same time, comprising a toothed index wheel connected with said gear, and a gear element meshing with said index wheel and operable to rotate the latter.

8. A gear grinding and generating machine comprising a grinding wheel mounted to rotate and having its active face in a plane at right angles to its axis of rotation, a holder for the gear to be ground arranged to hold such gear with the face of a tooth thereof in contact with said grinding wheel face, means for producing relative translative motion between said gear holder and grinding wheel in the directions of the line of said axis, and means for rotating such gear at the same time and at such speed that the linear velocity of the base circle of the gear tooth curves is equal to the velocity of such relative motion.

9. A gear grinding and generating machine comprising a grinding wheel mounted to rotate and having its active face in a plane at right angles to its axis of rotation, a holder for the gear to be ground arranged to hold such gear with the face of a tooth thereof in contact with said grinding wheel face, and with the base circle of the gear tangent to a line parallel to said axis passing through said wheel face, and means for rotating such gear at the same time at such velocity and in such direction that the resultant relative motion between the gear and the grinding wheel is the same as the motion of said base circle rolling on said tangent line.

10. A gear grinding and generating machine comprising a grinding wheel mounted to rotate and having its active face in a plane at right angles to its axis of rotation, a holder for the gear to be ground arranged to hold such gear with the face of a tooth thereof in contact with said grinding wheel face, and with the base circle of the gear tangent to a line parallel to said axis passing through said wheel face, a toothed index wheel connected to the gear to be ground, a driving gear element in mesh with said index wheel, and means for causing relative motion to take place between said gear element and index wheel at the velocity and in the direction which causes the gear being ground to roll relatively to the grinding wheel face in the same manner as it would roll in mesh with a rack of which the tooth faces are perpendicular to its pitch line.

11. A gear grinding and generating machine comprising a holder for the gear to be ground, a toothed index wheel mounted on said holder in such manner as to turn such gear when rotated, and being of different pitch diameter than the gear, a grinding wheel mounted rotatably in position to have its active face make contact with the face of a tooth of such gear, a worm in mesh with said index wheel, means for producing relative movement of displacement between said holder on the one hand and said grinding wheel and worm on the other hand, whereby the index wheel and gear are rotated, and means for rotating the worm at the same time to turn the index wheel and gear through an additional angle, for the purpose set forth.

12. In a gear grinding and generating machine, a grinding wheel, a carriage having means for supporting the gear to be ground, and being movable in a straight line to carry such gear past the grinding wheel, a lead screw engaged with the carriage, mechanism for giving rotative movements to said screw alternately in opposite directions to move the carriage back and forth in such line, and means for rotating the gear during such movement in one direction.

13. In a gear grinding and generating machine having a grinding wheel and a carriage for the gear to be ground, mounted and guided to travel in a straight line, a means for propelling said carriage back and forth in such line comprising a lead screw engaged with the carriage, a pinion on said lead screw, a gear segment geared to said pinion and operable to rotate the same, and a cam operatively engaging said segment for rocking the same alternately and in opposite directions.

14. In a gear generating machine having a rotatable cutting tool and a carriage for the gear to be generated, a lead screw engaged with the carriage for propelling the same, a pinion on said screw, a segment geared to said pinion for rotating the same and mounted to rock, and two cams engaging different parts of said segments, one of said cams arranged and operable to rock the segment in one direction, and the other to rock it in the opposite direction.

15. In a gear generating machine, a rotary cutting tool, a carriage movable past said tool holding the gear to be cut, means for rotating said gear while passing the tool, a holder for the cutting tool supporting the same with its acting portion arranged to cut a side of a tooth on the gear, and means for moving the tool transversely both to the line in which the carriage moves and to the pitch surface of the gear.

16. In a gear grinding machine, a holder for the gear to be ground, a grinding wheel, a holder for said grinding wheel, one of said holders being movable with respect to the other to produce relative movement between the grinding wheel and gear, with the face of the former in engagement with a tooth of the latter, means for simultaneously rotating the gear, and means for producing a further relative movement between the gear and grinding wheel, transverse to the pitch surface of the gear and to the line of the first-named relative movement and during the continuations of the same.

17. In a gear grinding machine, a holder for the gear to be ground, a grinding wheel having its active face in a plane perpendicular to its axis of rotation, a holder for said grinding wheel, means for producing relative translative movement parallel to such axis betwen the grinding wheel and the gear to be ground, means for simultaneously rotating the gear at such rate as to produce the effect of rolling the gear tooth in contact with the acting face of the wheel, and means for progressively displacing the wheel transversely both of the direction of the aforesaid relative movement during the continuance of such movement and of the pitch surface of the gear.

18. In a gear grinding machine having a grinding wheel in a straight line, a carriage movable past said wheel and holding the gear to be ground, and means for rotating said gear while passing the wheel; a holder for the grinding wheel holding the same with its acting face in a plane at right angles to the line of travel of the carriage, and means for moving the wheel transversely of said line while in engagement with a tooth of the gear.

19. In a gear grinding and generating machine having a movable gear holding carriage, a grinding wheel located to engage a tooth of the gear carried by said carriage and having its acting face in a plane at right angles to the line of movement of the carriage, and positive means for rotating said gear about its axis during movement of the carriage at a velocity such that its base circle rolls tangent to a line parallel to such movement.

20. In a gear grinding machine, a grinding wheel, a holder for the same, a gear holder, means for producing relative translative movement between said gear holder and grinding wheel holder, the grinding wheel having its acting face at right angles to the direction of such relative movement, arranged to act upon the side of a tooth of the gear so carried, and means for rotating the gear on the carriage while such relative movement takes place at such a rate that the linear velocity of the base circle of the gear is equal to the velocity of such movement.

21. A grinding machine for generating gear tooth curves, comprising means for holding a gear blank, a grinding wheel having its acting face perpendicular, and its axis parallel, to a line tangent to the base circle of the gear, and means for producing a combination of relative translative movements between the gear and grinding wheel and rotational movement of the gear with the effect of rolling the gear on its base circle on such tangent line, thereby causing the grinding wheel to generate an original involute curve in the face of the gear tooth.

22. In a gear grinding and generating machine having a translatively movable gear-holding carriage and means for rotating said gear on the carriage during movement thereof, a grinding wheel located to engage a tooth of the gear being thus translated and rotated, and means for moving said grinding wheel transversely to the line of travel of the carriage while in engagement with such tooth in unison with said movement, whereby to distribute the wear on said wheel over its acting face.

23. A machine as set forth in claim 22 distinguished further by means for shifting the location of the path in which the aforesaid movement of the wheel takes place, to coact with gears of larger or smaller diameter.

24. In a gear grinding and generating machine, means for moving the gear to be ground with the effect of rolling the same upon its base circle, a rotatable grinding wheel arranged and having points in its acting face which, in the rotation of said wheel, successively occupy the relation with respect to said gear of a scribing point in a plane surface on which said base circle rolls, and means for so displacing the grinding wheel while in contact with a tooth of the gear as to shift the location of such scribing point toward and away from the center of the wheel and thereby distribute the wear of the wheel.

25. In a grinding machine, a grinding wheel, an oscillative holder for said grinding wheel, an arm arranged to actuate said holder for causing the same to be oscillated, a cam arranged to operate said arm whereby to swing the same and the holder back and forth, and means for altering the angle between the holder and the line from its axis to the cam, whereby to shift the location and limits of the arc through which the wheel swings.

26. In a grinding machine a grinding wheel, a back and forth movable holder for said wheel, an actuator for said holder bearing against the same and movable back and forth for operating it, and an abutment on said holder against which said actuator bears, the abutment being adjustable to change the relation between the holder and actuator, and thereby the location of the path of movement of the grinding wheel.

27. In a grinding machine, a grinding wheel, an oscillative holder for said wheel, an operating arm coaxially mounted with said holder, means for vibrating said arm, and an abutment carried by the holder against which said arm bears, said abutment being adjustable to alter the angle between the holder and arm.

28. In a grinding machine, a grinding wheel, an oscillative holder for said wheel, an operating arm for oscillating said holder and wheel, means for vibrating said arm, a cam movably mounted on said holder having a surface abutting against said arm, different points in said cam surface being at different distances from the line in which the cam is adapted to move, whereby adjustment of the cam is effective to alter the angle between said grinding wheel holder and arm.

29. In a grinding machine, a grinding wheel, an oscillative holder carrying said wheel, an operating arm mounted coaxially with said holder, means for vibrating said arm, a cam rotatably mounted on said holder having its cam surface arranged to bear on a portion of said arm, a gear associated with said cam, a pinion in mesh with said gear, and means for rotating said pinion, whereby to turn the gear and cam, and therefore adjust the latter to alter the angle between said holder and arm.

30. In a gear grinding and generating machine, a carriage for the gear to be ground, an index wheel rotatably mounted on said carriage, and with which such gear is rigidly connected, a grinding wheel past which the gear is carried by movements of the carriage, means for moving said carriage back and forth, a worm meshing with said index wheel, means for driving said worm rotatably while the carriage is in motion in one direction, and means for interrupting the worm drive while the carriage moves in the opposite direction, whereby said worm is caused to remain stationary and to turn the index wheel and thereby index the gear.

31. In a gear grinding and generating machine a holder for the gear to be ground, a grinding wheel and a holder for the grinding wheel, means for producing relative movement between said gear holder and grinding wheel in one direction for grinding, and in the opposite direction to return the same, mechanism including an index wheel associated with the gear and a driven gear element for turning said index wheel while the grinding operation takes place, and means for causing an interruption in the drive of said gear element during the return relative movement, whereby to index the gear.

32. In a gear grinding machine, a mechanism for giving rolling generating movement to the gear to be ground, and for indexing such gear, comprising a toothed index wheel with which the gear is connected, a driving worm in mesh with said index wheel, means for producing relative movements of displacement between said index wheel and worm in opposite directions axially of the worm, whereby the index wheel is turned, and means for rotating the worm at the same time to turn the index wheel through an additional angle to that given by said relative movement of displacement.

33. In a gear grinding machine, a mechanism for giving rolling generating movement to the gear to be ground, and for indexing such gear, comprising a toothed index wheel with which the gear is connected, a driving worm in mesh with said index wheel, means for producing relative movements of displacement between said index wheel and worm in opposite directions axially of the worm, whereby the index wheel is turned, means for rotating the worm at the same time to turn the index wheel through an additional angle to that given by said relative movement of displacement and means for stopping the rotation of the worm during the continuance of such displacement in one direction.

34. In a gear grinding machine, a mechanism for giving rolling generating movement to the gear to be ground, and for indexing such gear, comprising a toothed index wheel with which the gear is connected, a driving worm in mesh with said index wheel, means for producing relative movements of displacement between said index wheel and worm in opposite directions axially of the worm, whereby the index wheel is turned, means for rotating the worm first in one direction and then reversely in unison with the opposite displacement movements, and means for causing the total angle through which the worm is rotated during the displacement movement in one direction to be less than that through which it is rotated in the opposite direction during the opposite displacement movement.

35. In a gear grinding machine, a mechanism for giving rolling generating movement to the gear to be ground, and for indexing such gear, comprising a toothed index wheel with which the gear is connected, a driving worm in mesh with said index wheel, means for producing relative movements of displacement between said index wheel and worm in opposite directions axially of the worm, whereby the index wheel is turned, means for rotating the worm first in one direction in unison with the displacement movement in one direction, and then reversely when the displacement movement is reversed, and means for causing the angle of rotation of the worm in one direction to be less than its rotation in the opposite direction by the amount which causes the gear being ground to be turned through the angle between corresponding points on two adjacent teeth.

36. The combination with a toothed index wheel, of a worm meshing with said wheel, means for producing relative displacement movements between said wheel and worm axially of the latter alternately in opposite directions, whereby the index wheel is turned by rolling in mesh with the worm, means for also rotating the worm to turn the index wheel through an additional angle in the course of the displacement movement in one direction, and means for stopping the rotation of the worm during the displacement movement in the opposite direction.

37. In combination with an index wheel, a gear element meshing with said index wheel, means for producing relative translative movement between said index wheel and gear element, whereby the index wheel is rotated, mechanism for independently moving said gear element to impart an additional rotation to the index gear, and means for interrupting such independent motion of the gear element during the existence of said translative movement.

38. In a machine according to claim 30, a composite gear comprising two clutch connected gear elements as part of the driving means for said work, and mechanism for uncoupling one of said elements from the other in order to stop the rotation of said worm as set forth.

39. In a gear generating grinding machine, a carriage for the gear to be ground, a grinding wheel, means for moving said carriage back and forth past the grinding wheel in a path which brings a tooth of the gear carried thereby in operative relation to said wheel, an index wheel rotatably mounted on said carriage with which the gear to be ground is rigidly connected, means for giving said index wheel a certain character of rotation during the traverse of the carriage in one direction, whereby to roll the gear by the grinding wheel, and means for giving a different character of rotation to the index wheel in the opposite traverse of the carriage to index the gear.

40. In a machine according to claim 39, a lead screw for moving said carriage, a worm for rotating said index wheel, gears connected with said worm and screw, respectively, an intermediate gear composed of two sections one of which meshes with the gear of the screw and the other with the gear of the worm, said sections being rotatable relatively to one another and one being movable axially away from the other, clutch members connected with said gear sections interengaged when the sections are brought together and adapted to be disengaged when one section is moved away from the other, and means for thus disengaging said clutch members from time to time during the operation of the machine.

41. In a machine according to claim 40 having axially separable gear sections and a clutch as set forth, means for separating one of said sections from the other comprising a rod which is connected to said separable section and is movable endwise, a rotating shaft, a tappet on said shaft, a rock shaft having two arms, a rod connected to one of said arms and extending on said tappet being arranged to be shifted endwise by the latter, the other arm of said rock shaft being arranged to engage the rod of said separable gear section and remove the latter out of clutched engagement with the other section when said connecting rod is thus moved.

42. In a gear generating grinding machine having a movable carriage for the gear to be ground, a screw for moving said carriage back and forth, means for rotating said screw first in one direction and then in the other, an index wheel with which the gear to be ground is connected, mounted rotatably on said carriage, a worm meshing with the teeth of said index wheel and restrained from movement with the carriage, transmission gearing between the screw and worm for turning the latter in unison with the former, and automatic means for periodically disconnecting said gearing, whereby the rotation of the worm is at such times stopped while the screw rotates.

43. In a gear generating grinding machine having a grinding wheel and a movable gear-holding carriage adapted to carry the gear to be ground past the wheel, a toothed index wheel connected to the gear to be ground, a worm engaging said index wheel for turning the latter as the carriage moves, a lead screw for moving the carriage back and forth, a nut mounted in the carriage meshing with said screw, and means for turning said nut relatively to the carriage for adjusting the carriage and the gear carried thereby to the grinding wheel.

44. In a gear generating grinding machine, a grinding wheel, a movable gear holding carriage arranged and movable to carry the gear to be ground past said grinding wheel, a toothed index wheel connected to the gear to be ground, a worm engaging said index wheel returning the latter as the carriage moves, a lead screw for moving said carriage back and forth, a nut in mesh with said screw mounted on the carriage in a rotatable manner, a releasable clamp on the carriage normally engaging said nut to prevent rotation thereof, and means associated with said nut for rotating the same when the clamp is released, whereby to adjust the carriage and the gear carried thereby with respect to the grinding wheel.

45. In a gear generating grinding machine, a carriage for the gear to be ground, a grinding wheel past which said carriage is moved, an index wheel on the carriage for turning the gear while the carriage travels, a worm meshing with said wheel and being rotatable to give a regulated rotation to said index wheel, and means for adjusting said worm endwise for bringing the tooth of the gear to be ground into a determined relation with the grinding wheel.

46. In a gear generating grinding machine, a carriage for the gear to be ground, a grinding wheel located with respect to said carriage in position for grinding the face of a tooth of such gear, an index wheel on the carriage connected with the gear to be ground, means for producing relative movement between said carriage and grinding wheel, a worm meshing with said index wheel arranged to rotate said wheel and the gear while such relative movement takes place in such manner as to produce a compound generating movement between the gear and the grinding wheel, a bushing in which the wheel has its bearing and with which it is engaged so as to prevent relative endwise movement, said bushing being itself movable endwise in the machine frame, and means for moving it so as to adjust the worm endwise for bringing the tooth of the gear into a given relation with the grinding wheel.

47. In a gear generating grinding machine, a carriage for the gear to be ground, a grinding wheel located with respect to said carriage in position for grinding the face of a tooth of such gear, an index wheel on the carriage connected with the gear to be ground, means for producing relative movement between said carriage and grinding wheel, a worm meshing with said index wheel arranged to rotate said wheel and the gear while such relative movement takes place in such manner as to produce a compound generating movement between the gear and the grinding wheel, a bushing in which the wheel has its bearing and with which it is engaged so as to prevent relative endwise movement, said bushing being in threaded engagement with the machine frame and being rotatable and means for rotating said bushing so as to adjust the same endwise and thereby correspondingly displace the worm to bring the tooth of the gear into a given relation with the grinding wheel.

48. In a gear generating grinding machine, a grinding wheel, a carriage for the gear to be ground, means for moving said carriage past the grinding wheel, means for rotating the gear at the same time, means for moving the wheel transversely to the line of travel of the gear to its pitch surface during the traverse of the gear, and means for varying the extent of such travel of the wheel for gears having teeth of different depths.

49. The combination with a grinding wheel carrier movable back and forth, a rotatable cam having a cam surface arranged to actuate said carrier so as to cause the same to move back and forth, said cam having zones wherein the extent of throw is different from that in other zones, and means for shifting said cam so as to bring different zones thereof in position to operate said carrier.

50. The combination with a grinding wheel carrier movable back and forth, a rotatable cam having a cam surface arranged to actuate said carrier so as to cause the same to move back and forth, said cam being tapered axially whereby its throw in different zones is different, and means for shifting said cam axially to bring different zones thereof into action upon said carrier.

51. The combination of a cam and an element arranged to be actuated by said cam, the cam being formed with different extents of throw in different zones, and means for effecting relative adjustments between the cam and said driven element such as to bring different zones of the cam into operative relation with the driven element.

52. The combination with a shaft, a cam mounted on said shaft with provision for movement axially thereof and having in its cam surface zones which differ from one another in the extent of throw thereof, a driven element bearing on said cam surface and actuated thereby, said shaft being internally bored and having a slot in its side, a nut adapted to slide in the bore of said shaft, a pin passing from said cam through said slot and engaged with said nut, and a screw threaded into said nut and projecting from the bore of said shaft, adapted to be rotated to shift the cam axially, whereby to bring different zones of the cam into coaction with said driven element.

In testimony whereof I have affixed my signature.

EDWIN R. FELLOWS.